No. 855,883. PATENTED JUNE 4, 1907.
F. H. GOODNIGHT & J. F. DUFFIN.
COTTON AND CORN PLANTER.
APPLICATION FILED AUG. 26, 1905.
2 SHEETS—SHEET 1.
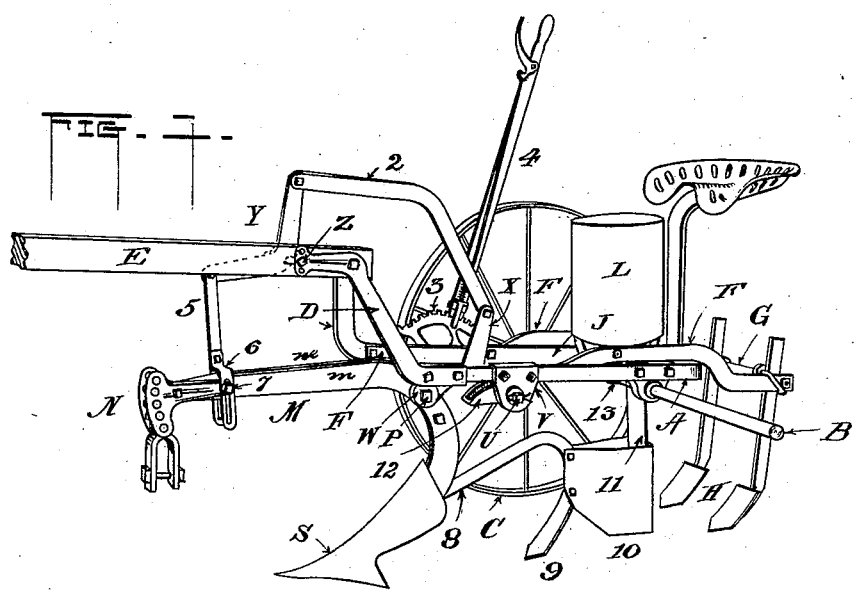
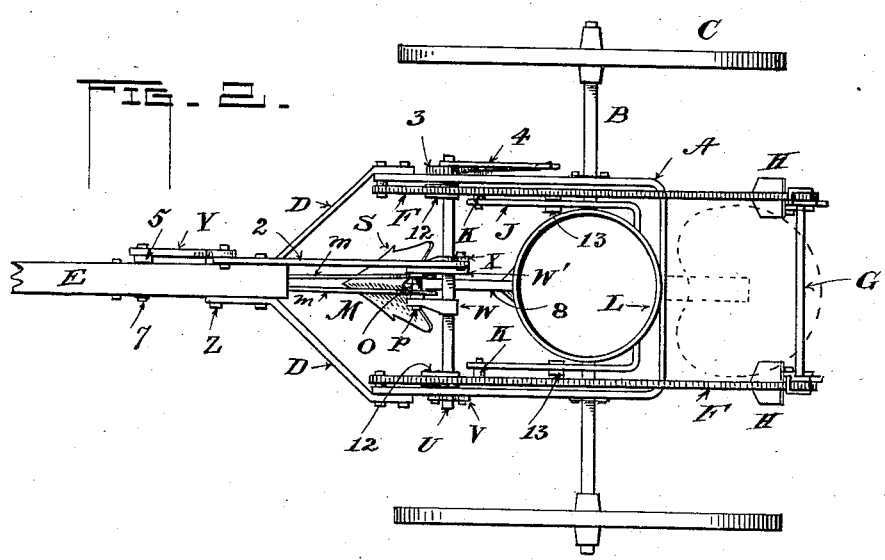
Witnesses:
mac Davis
E. J. Atwood
Inventors:
Frank H. Goodnight,
James F. Duffin,
By L. M. Thurlow,
Atty.
THE NORRIS PETERS CO., WASHINGTON, D. C.

No. 855,883. PATENTED JUNE 4, 1907.
F. H. GOODNIGHT & J. F. DUFFIN.
COTTON AND CORN PLANTER.
APPLICATION FILED AUG. 26, 1905.
2 SHEETS—SHEET 2.
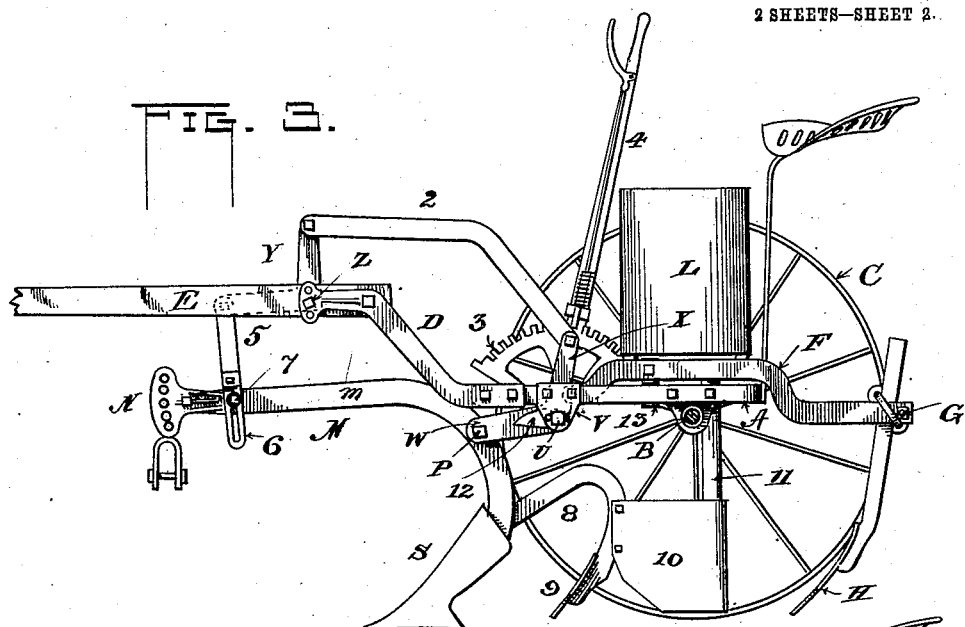
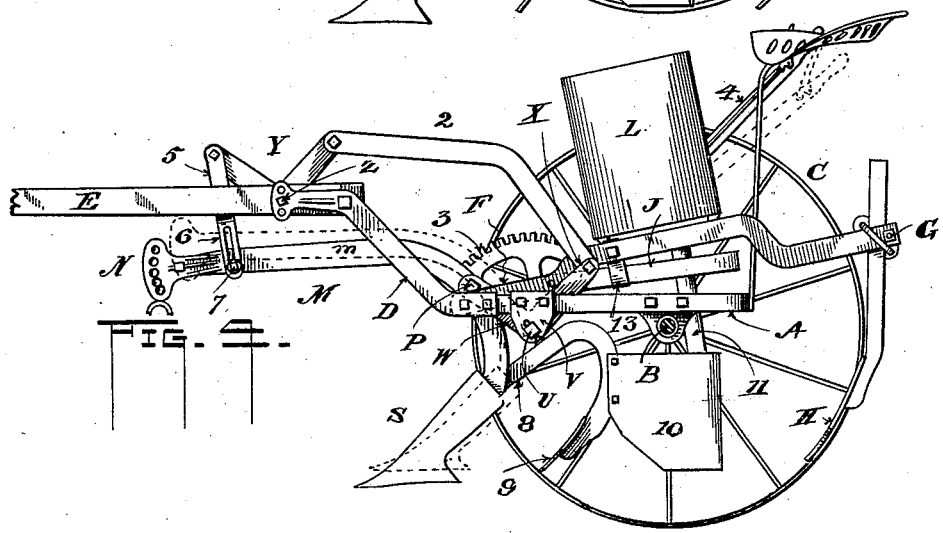
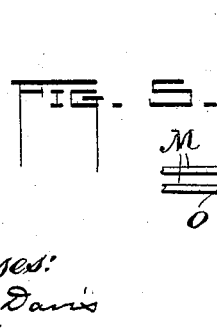
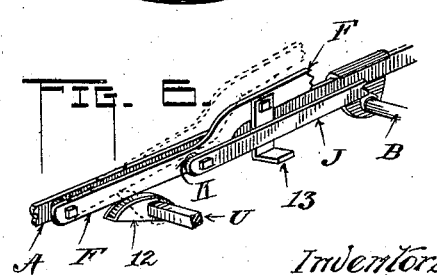

UNITED STATES PATENT OFFICE.

FRANK H. GOODNIGHT, OF DALLAS, TEXAS, AND JAMES F. DUFFIN, OF PEORIA, ILLINOIS, ASSIGNORS TO KINGMAN PLOW COMPANY, OF PEORIA, ILLINOIS, A CORPORATION OF ILLINOIS.

COTTON AND CORN PLANTER.

No. 855,883.　　　Specification of Letters Patent.　　　Patented June 4, 1907.

Application filed August 26, 1905. Serial No. 275,931.

*To all whom it may concern:*

Be it known that we, FRANK H. GOODNIGHT and JAMES F. DUFFIN, both citizens of the United States, the said FRANK H. GOODNIGHT residing at Dallas, in the county of Dallas and State of Texas, and the said JAMES F. DUFFIN residing at Peoria, county of Peoria, and State of Illinois, have invented certain new and useful Improvements in Cotton and Corn Planters; and we do hereby declare that the following is a full, clear, and exact description of the invention, which will enable others skilled in the art to which it appertains to make and use the same.

This invention has reference to a new and improved cotton and corn planter.

This invention relates to machines of the class wherein the operator rides in the rear of the axle in position to see and control all working parts, while the entire weight of the machine and the operator is substantially balanced upon the axle, so that no material part of the weight is borne by the horses. In this apparatus, the plow swings vertically beneath the frame, is drawn directly by the horses, and forms the only draft connection with the frame above, the tongue serving only for guiding the machine. Although the plow is thus free and drawn directly, the devices are such that a single lever by a single movement controls the plow, seeding devices and coverers, throwing all into or out of operation.

Figure 1 is a perspective view of our improved planter. Fig. 2 is a top view of the same. Fig. 3 is a side elevation of the planter showing the plow-beam in its operative position. Fig. 4 is also a side elevation of the planter showing the plow-beam raised for transportation. Fig. 5 is a top view of portions of a rock-shaft and arms for carrying the plow-beam and Fig. 6 is a perspective view of a portion of the planter-frame.

A indicates the planter-frame carried as usual on the axle B and wheels C. Said frame is preferably made in the form of a U to the free forward ends of which are secured upwardly and forwardly extending arms D which support the tongue E. Within said frame A near its forward end is pivoted a second frame composed of the members F, F, G which frame extends rearwardly from its pivots and carries the coverers or shovels H H considerably in the rear of the axle B. Also a third frame J corresponding in form to the frame A is pivoted at its free ends to the inside of the members F F at K, Fig. 2, and carries the seed-box L. We now desire to direct attention to the plow-beam of our planter which forms an important part of our invention and in order to first make the value thereof apparent it is to be understood that in planters of this type the furrow-opener or other like member has usually been supported from the tongue by means of a downwardly extending post or equivalent member suitably braced to withstand the great strain to which said furrow-opener is subjected. In thus carrying the latter upon the tongue it follows that the horses must be attached also to the tongue. The result is that when at work in the ground the furrow-opener by pressure of dirt thereagainst causes the forward end of the tongue to be depressed and the pressure which is more or less constant is transferred to the necks of the horses. In addition to this when the said furrow-opener is carried on the tongue it necessitates a forwardly extending brace to properly maintain it in position but the brace catches weeds and trash which eventually clog the furrow-opener.

It is our purpose to provide a plow-beam to which the horses may be directly attached thus relieving the pressure on the tongue and providing also for allowing the plow-beam to be raised a greater distance above the ground than can be done in implements having the construction just mentioned. The means for supporting and operating the beam consists first of a rock-shaft U, carried on the frame A by means of bearings V, having twin arms WW' affixed thereto and between the free ends of which is held the plow-beam M described, by means of a bolt P. Formed with the arm W' is an upwardly extending arm X which together with said arm W' constitutes a bell-crank. Pivoted at Z on the tongue E is a similar bell-crank Y, said crank being positioned substantially the same as the crank on the shaft U and both are connected by means of an arm 2 preferably bent as shown to be out of the way of the rest of the apparatus. At the right side of the planter-frame is a notched quadrant 3 with which engages a lever 4 carried on the end of the rock-shaft U. The free end of the bell-crank Y pivoted on the tongue has suspended therefrom a hanger composed of a member 5 slotted at its lower end and a bent member 6 secured thereto to form a fork which straddles the forward end of the plow-beam as shown, said member 6 being slotted to correspond with the member 5. A bolt 7 passes through both members and the beam but remains loose in order that the beam may play up and down between said members a purpose which will be understood later. From the foregoing it will be seen that a movement of the lever toward the rear of the machine will raise the beam as indicated in Fig. 4 to any desired height. When the limit of height is reached the beam will contact with the rock-shaft as shown by broken lines and if the lever is still further moved as shown by said broken lines the forward end of said beam will be raised since the point of connection of the arms W and the beam is above the point where the beam and shaft U meet. The result is to tip or raise the extremity of the plow-member or point S still farther from the ground so as to be entirely free of all obstructions that may be passed over during the time the implement is passing to or from the field. In referring to the foregoing, the plow-beam is indicated by M, the same being substantially of the form usually employed on plows, the forward end having a clevis N while a furrow-opener S already mentioned is carried at the lower end of the beam in any good manner. The beam M has secured thereto an arm or drag-bar 8 and a shovel 9 which are common to most all machines of this character, these being rigidly secured thereto. The said arm 8 also has attached thereto a shield 10 through which the seed drops from the seed-tube 11 of the box L.

Hereinbefore we have described the relation of the frames F, F, G and J to each other and to the main frame A and we now desire to describe the manner in which they are operated to raise the seed tube and the coverers or shovels H from the ground simultaneously with the raising of the plow-beam. Secured to the rock-shaft U near each end just inside the frame A is a member 12 designed to contact with the under side of the frame F, F, G to raise that member when the lever 4 is operated to raise the beam M, this being shown in Fig. 6 in dotted lines. Attached to the frame members FF are depending L-shaped members 13 which when raised with said members FF contact with and raise the seed-box frame J as shown in Fig. 4, said members, however, being free of frame A while at work. By the peculiar combination of elements entering into the construction of the planter all the ground engaging members are raised simultaneously. In hitching the horses to the beam M that member takes the entire strain and the planter in the rear is drawn forward by reason of the connection of the beam with the rock-shaft U. The forward end of the beam is permitted to "float" the bolt 7 being loose so that it may play up and down in the slotted members 5 and 6 as explained. By this means all the downward pressure on the tongue heretofore existing by reason of the older constructions is eliminated and the horses are not unnecessarily burdened.

As may be inferred it is one of our aims to provide a stop against which the plow-beam may strike when it has been raised to its upward limit in order to elevate the point of the furrow-opener. This is accomplished by causing the beam to contact with the rock shaft U as already described but we desire to make it plain that we may provide a special stop at some other point if found desirable, using it in lieu of the said shaft. It is not the intention to confine ourselves to the particular means shown and described as to any part or combination of parts in our improved cotton and corn planter since equivalent mechanism may be employed.

What we claim is

1. The combination with a main, wheel-supported planter frame having a guiding tongue, of a plow supported by said frame and swinging freely upon a horizontal pivotal axis and arranged to transmit the entire tractional force of the horses, a covering shovel frame pivoted to said main frame, a seed-box frame pivoted to the shovel frame, and a single means for at will raising the plow, bodily, the shovels and the seed-box out of operative positions.

2. The combination with a main, wheel-supported planter frame provided with a rigidly attached guiding tongue, of a plow support pivoted to said frame, a plow having its beam pivoted to said support and swinging freely in a vertical plane upon its pivot, a rearwardly extending shovel frame pivoted to the main frame, a seed-box frame pivoted to the shovel frame, and a single means for at will swinging upward the plow, bodily, the shovel frame, and the seed-box frame, substantially as set forth.

3. The combination with a main, wheel-supported, plow-carrying frame having a rigidly attached guiding tongue, an arm pivoted to the main frame to swing on a horizontal pivot, a plow beam pivoted to the free end of said arm and rocking freely in a vertical plane upon its pivot, draft devices attached to the forward end of the plow beam, a stop in the rear of the beam pivot to arrest the upward movement of the rear end of the beam at a predetermined point when it is lifted by said arm, a shovel frame pivoted to the main frame and extending to the rear of the axle, a seed-box frame pivoted to the shovel frame, and a single means for swinging said arm, the shovel frame and the seed-box frame upward upon their pivots, respectively.

4. The combination with a main, wheel-supported frame having a guiding tongue free from traction devices, of a shovel frame pivoted near its forward end to the main frame, a seed-box frame pivoted near its forward end to the shovel frame, a plow pivotally supported from the main frame and transmitting the entire tractional force, means for at will raising the plow, bodily, and the shovel frame, and means whereby the shovel frame in rising engages and lifts the seed-box frame at a predetermined point.

5. A planter of the class described comprising a wheel supported carrying frame and its guiding tongue, a plow beam carried by the frame in front of the axle and provided with draft attaching devices, a shovel frame pivoted near its forward end to the carrying frame and extending to the rear of the axle, a seed-box frame pivoted near its forward end to the shovel frame and also extending in rear of the axle, a seat, borne by the carrying frame, in the rear of the axle and seed-dropping devices, and a single lever arranged for at will raising the shovel frame and seed box frame, substatially as set forth.

6. A planter of the character described comprising the carrying frame, a rock-shaft journaled thereon, a plow-beam, devices on the shaft for pivotal connection with said beam, the planter tongue, a device pivoted thereon for supporting the forward end of the beam, a connection between the devices on the shaft and the device on the tongue, a shovel carrying frame pivoted to the carrying frame, a seed-box frame pivoted to the shovel frame, and means for simultaneously raising the plow-beam and the two pivoted frames.

In testimony whereof we affix our signatures, in presence of two witnesses.

FRANK H. GOODNIGHT.
JAMES F. DUFFIN.

Witnesses:
L. M. THURLOW,
ARTHUR KEITHLEY.